(12) United States Patent
Teichmann et al.

(10) Patent No.: US 8,555,241 B2
(45) Date of Patent: Oct. 8, 2013

(54) AUTOMATED SCHEDULING OF MASS DATA RUN OBJECTS

(75) Inventors: Jan Teichmann, Neustadt/Weinstrasse (DE); Andreas Wolber, Heidelberg (DE); Lin Cai, Shanghai (CN)

(73) Assignee: SAP AG, Walldorf (DE)

( * ) Notice: Subject to any disclaimer, the term of this patent is extended or adjusted under 35 U.S.C. 154(b) by 972 days.

(21) Appl. No.: 12/634,099

(22) Filed: Dec. 9, 2009

(65) Prior Publication Data

US 2010/0146510 A1  Jun. 10, 2010

Related U.S. Application Data

(60) Provisional application No. 61/121,505, filed on Dec. 10, 2008.

(51) Int. Cl.
*G06F 9/44* (2006.01)
*G06F 9/445* (2006.01)

(52) U.S. Cl.
USPC ............................ 717/102; 717/103; 717/177

(58) Field of Classification Search
None
See application file for complete search history.

(56) References Cited

U.S. PATENT DOCUMENTS

| | | | |
|---|---|---|---|
| 5,499,357 A | 3/1996 | Sonty et al. | |
| 5,619,716 A | 4/1997 | Nonaka et al. | |
| 5,838,918 A | 11/1998 | Prager et al. | |
| 5,913,218 A | 6/1999 | Carney et al. | |
| 5,923,850 A | 7/1999 | Barroux | |
| 6,519,571 B1 | 2/2003 | Guheen et al. | |
| 6,560,704 B2 | 5/2003 | Dieterman et al. | |
| 6,681,382 B1 | 1/2004 | Kakumani et al. | |
| 6,766,334 B1 | 7/2004 | Kaler et al. | |
| 6,775,829 B1 | 8/2004 | Kroening | |
| 6,775,830 B1 | 8/2004 | Matsunami et al. | |
| 6,779,000 B1 | 8/2004 | Northrup | |
| 6,804,710 B1 | 10/2004 | Kawada et al. | |
| 6,816,964 B1 | 11/2004 | Suzuki et al. | |
| 6,868,427 B2 | 3/2005 | Herzog et al. | |
| 6,922,705 B1 | 7/2005 | Northrup | |
| 7,003,527 B1 | 2/2006 | Lavallee et al. | |
| 7,065,562 B2 | 6/2006 | Courtney | |
| 7,130,870 B1 | 10/2006 | Pecina et al. | |

(Continued)

FOREIGN PATENT DOCUMENTS

EP  1 443 700  10/2005

OTHER PUBLICATIONS

SAP Service Marketplace publication entitled "Customizing Scout," Published Mar. 19, 2001; pp. 1-2.

(Continued)

*Primary Examiner* — Kris Rhu
(74) *Attorney, Agent, or Firm* — Fish & Richardson P.C.

(57) ABSTRACT

Techniques are described in which indication of a computer application to be configured for use in a particular business enterprise is received. A mass data run object is identified. The mass data run object defines a computer operation to be performed by the computer application to transform business transaction data as part of a business process. The mass data run object identifies i) selection parameters to select business transaction data to be transformed by the computer operation defined by the mass data run object and ii) instructions, that when executed, perform the computer operation to transform the selected business transaction data. A mass data run object instance corresponding to the identified mass data run object is generated and scheduled for execution.

18 Claims, 5 Drawing Sheets

(56) References Cited

U.S. PATENT DOCUMENTS

| | | |
|---|---|---|
| 7,165,041 B1 | 1/2007 | Guheen et al. |
| 7,325,015 B2 | 1/2008 | Zhou et al. |
| 7,424,602 B2 | 9/2008 | Reiss et al. |
| 7,496,746 B2 | 2/2009 | Rajput |
| 7,506,145 B2 | 3/2009 | Zenz et al. |
| 7,519,908 B2 | 4/2009 | Quang et al. |
| 7,523,077 B2 | 4/2009 | Wu et al. |
| 7,533,380 B2 | 5/2009 | Neuer et al. |
| 7,565,684 B2 | 7/2009 | Fiedler et al. |
| 8,326,706 B2 * | 12/2012 | Clemens et al. ............... 705/28 |
| 2003/0191776 A1 | 10/2003 | Obrador |
| 2003/0222903 A1 | 12/2003 | Herzog et al. |
| 2003/0225741 A1 | 12/2003 | Herzog et al. |
| 2004/0143428 A1 | 7/2004 | Rappaport et al. |
| 2004/0215656 A1 | 10/2004 | Dill et al. |
| 2004/0216090 A1 | 10/2004 | Kaler et al. |
| 2004/0250247 A1 | 12/2004 | Deeths et al. |
| 2005/0004942 A1 | 1/2005 | Madsen et al. |
| 2006/0010163 A1 | 1/2006 | Herzog et al. |
| 2006/0010434 A1 | 1/2006 | Herzog et al. |
| 2006/0229888 A1 * | 10/2006 | Colle et al. ..................... 705/1 |
| 2006/0282400 A1 * | 12/2006 | Kalavacharla et al. ........... 707/1 |
| 2007/0233541 A1 * | 10/2007 | Schorr et al. ..................... 705/8 |
| 2008/0082575 A1 * | 4/2008 | Peter et al. ................ 707/103 Z |
| 2008/0161940 A1 * | 7/2008 | Gerwens et al. .................. 700/4 |
| 2008/0163218 A1 * | 7/2008 | Ostermeier et al. .......... 718/101 |

OTHER PUBLICATIONS

SAP Best Practices J00 Essential Information; pp. 1-53; (Nov. 2003).

* cited by examiner

AUTOMATED SCHEDULING OF MASS DATA RUN OBJECTS

CROSS REFERENCE TO RELATED APPLICATIONS

This application claims the benefit of U.S. Provisional Application No. 61/121,505, filed Dec. 10, 2008, and titled AUTOMATED SCHEDULING OF MASS DATA RUN OBJECTS, which is incorporated by reference in its entirety.

TECHNICAL FIELD

This description relates to techniques for automated scheduling of business transaction processing performed by computer systems.

BACKGROUND

Computer applications often are used to manage and process business data. To do so, a business enterprise may use various computer application programs running on one or more enterprise information technology systems. Application programs may be used to process business transactions and perform business processes, such as taking and fulfilling customer orders, providing supply chain and inventory management, performing human resource management functions, and performing financial management functions. Application programs also may be used for analyzing data, including analyzing data obtained through transaction processing systems. In many cases, application programs used by a business enterprise are developed by a commercial software developer for licensing or sale to, and use by, many business enterprises.

SUMMARY

In one general aspect, indication of a computer application to be configured for use in a particular business enterprise is received. The computer application includes instructions that, when executed, cause business transaction data to be processed in a manner that is applicable to many different business enterprises. A mass data run object is identified. The mass data run object defines a computer operation to be performed by the computer application to transform business transaction data as part of a business process. The mass data run object identifies i) selection parameters to select business transaction data to be transformed by the computer operation defined by the mass data run object and ii) instructions, that when executed, perform the computer operation to transform the selected business transaction data. A mass data run object instance corresponding to the identified mass data run object is generated. Selection parameters identified by the mass data run object identify substantially all of the business transaction data to be transformed by a computer operation defined by the mass data run object instance. The instructions identified by the mass data run object to perform the computer operation on business transaction data selected as defined by the selection parameters of the mass data run object instance are scheduled for execution at a later time period. The identifying the mass data run object, generating the mass data run object instance, and scheduling for execution at a later time period are performed without human intervention in response to the received indication of the computer application.

Implementations may include one or more of the following features. For example, human intervention may be or include without receiving user input. The mass data run object may be or include a type of mass data run object. The mass data run object instance may be or include a first instance of a mass data run object. The mass data run object may be or include a second instance of the mass data run object. The first instance may be different than the second instance of the mass data run object.

Substantially all of the business transaction data may be substantially all of the business transaction data to be transformed by the computer operation defined by the mass data run object instance in a single run of the computer operation by the mass data run object instance.

The identifying the mass data run object, generating the mass data run object instance, and scheduling for execution at a later time period may be performed without human intervention in response to the received indication of the business function occur during deployment of the computer application before the computer application is used to process business transaction data at the particular business enterprise.

Receiving indication of the computer application may include receiving indication of a business function provided by a computer application. Identifying a mass data run object comprises identifying a mass data run object type. The computer application may be or include a customer relationship management application, an enterprise resource planning application, a supply chain management application, a supplier relationship management application, and/or a human resource management application.

Scheduling for execution may include scheduling for execution by creating an entry that identifies the mass data run object instance. The selection parameters of the mass data run object instance may identify substantially all of the employees employed by the particular business enterprise. The selection parameters of the mass data run object instance may identify substantially all of the organizational units of the particular business enterprise. The selection parameters of the mass data run object instance may identify substantially all of the products offered for sale by the particular business enterprise.

Implementations of the techniques discussed above may include a method or process, a system or apparatus, or computer software on a computer-accessible medium. The details of one or more of the implementations are set forth in the accompanying drawings and description below. Other features will be apparent from the description and drawings, and from the claims.

DESCRIPTION OF DRAWINGS

Like reference symbols in the various drawings indicate like elements.

DETAILED DESCRIPTION

Figure 1:
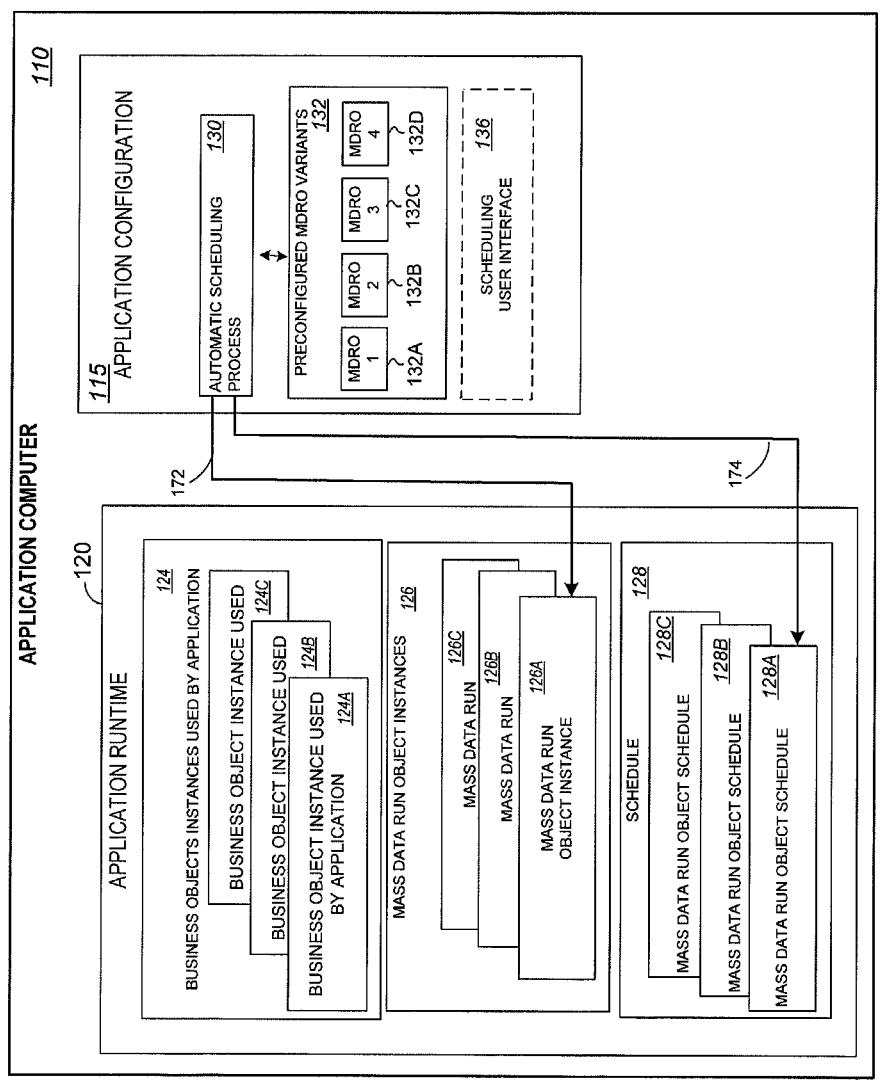
FIG. 1 is a block diagram of an example system capable of automated scheduling of a mass data run object for a business process to be performed by a computer for use by a particular business enterprise.

FIG. 1 depicts an example of a computer system 100 configured to perform automated scheduling of a mass data run object for a business process for use by a particular business enterprise. The system 100 runs a computer application or applications that perform business processes, and the system 100 may be referred to as an application computer. Some examples of computer applications include business applications that perform or support enterprise resource planning, customer relationship management, supply chain management, supplier relationship management, financial management, and human resource management. Some computer applications may be licensed or sold separately, or may be licensed or sold as part of a collection or "suite" of computer applications. For example, a business suite may be sold that includes a financial accounting and management application (or programs or functions), a human resource management application (or programs or functions), a customer relationship management application (or programs or functions), and a supply chain management application (or programs or functions). The business suite itself may be referred to as an application.

The system 100 includes an application configuration component 115 and an application runtime component 120 for a computer application.

The application runtime component 120 is a software component or environment that, at runtime, executes instructions to perform business processes. The application runtime component 120 may be a runtime environment. Instructions may be for example computer code, computer programs, or other collections of instructions that can be executed (either directly, after an interpretation process, or after a compilation process) by a processor or processors. The business processes may involve receiving user input directly through a user interface generated by the application and presented to a user on a display device. A business process need not necessarily involve receiving user input directly through a user interface.

The runtime processing component 120 includes various business object instances 124A-124C (which also may be referred to as business object nodes). A business object instance includes data and methods to process business transaction data. Examples of different types of business object instances include sales order object instances, delivery object instances, purchase order object instances, and warehouse object instances. A business object instance generally corresponds or otherwise represents a sales order for a particular sale of particular products to a particular customer, a particular invoice of particular products to a particular customer, a purchase order for a particular sale of particular products to a particular customer, or a time record for a particular employee during a particular time period. A business object instance is a specific occurrence, or a particular instantiation, of a type of a business object. A business object type may correspond to a type of document used in a business transactions—such as, for example, a sales order, an invoice, a purchase order, and a time record. The term "business object" may be used in two different ways. The term "business object" sometimes may be used to refer to a type of a business object. The term "business object" also may be used to refer to a business object instance, which is a particular instantiation of a business object type. A business object also may be referred to as an application object or a data object.

In some implementations, a business object may be implemented as an object class using object-oriented programming techniques. In such a case, an object class may be used to define the data and methods defined by a business object type, whereas an object instance may be used for business object instances that each store the particular data and methods for an occurrence of a business object type. As a business object may correspond to an object class, a business object instance may correspond to an object instance in an implementation that uses object-oriented programming techniques.

The application runtime component also includes mass data run object instances 126A-126C. A mass data run object ("MDRO") instance is an object that, like a business object instance, includes data and methods. In contrast to a business object that may correspond to a type of document used in a business transactions, a mass data run object encapsulates data and methods used to perform a business process on multiple business object instances without requiring user interaction or input during the performance of the business process. A mass data run object generally executes computer operations on a single type of business object, though this may not necessarily be the case. A business process to be performed by the mass run data object may be batch-oriented computer operations that perform a computer operation as part of a business process that may be run overnight or in another period. As such, the computer operations of the business process performed by the mass data run object do not (or are less likely to) interfere with other computer processes, such as interactive computer processes performed by users and involving users directly interacting with a user interface. Examples of a business process that may be performed by a mass data run object include aggregating daily time data entered by employees, creating sales orders based on purchase orders received, creating invoices to be sent in response to received delivery confirmations, and financial aggregation processes performed at the end of a financial period.

More particularly, a mass data run object instance includes methods that define the computer operations to be performed on business objects during the business process. A mass data run object instance includes selection parameters that identify which business objects the business process defined by the mass data run object is to be performed. For example, a mass data run object instance may indicate that time records for a particular day for employees in a particular organizational unit are to be selected for processing by the computer operation identified by the mass data run object. In another example, a mass data run object instance may indicate that sales by a particular organizational unit (out of many organization units of the business enterprise) or sales for a particular product are to be aggregated and sent to a financial accounting application. To do so, a mass data run object instance may store the selection parameters in the form of selection criteria or a selection query that identifies a subset of business object instances on which the computer operation is to be performed.

In some implementations, multiple selection parameters (may be used to identify the business objects on which the computer operations are to be executed. In some individual computer applications or suites of computer applications, there may be fifty to a hundred types of mass data run objects that need to be scheduled during a configuration process, where some of the mass data run objects have five to fifteen parameters to be set to select the business objects to be the subject of the computer operations.

The application runtime 120 also includes schedules 128 for performing the business processes defined by the mass data run object instances 126. The mass data run object schedules 128A-128C each identify scheduling criteria that defines a time period when a mass data run object is to be initiated or performed. The time period may be a specific date and time or may be a relative date and time. Examples of relative time periods include, for example, the first Saturday of a month starting at 10:00 p.m., every Friday night starting at 11:00 p.m., and every weekday morning at 5:00 a.m. In some cases, a relative time may be set relative to another computer operation. For example, a mass data run object may be initiated after the financial quarter has been closed in the accounting system. In more particular examples, a mass data run object schedule may indicate that a mass data run object for aggregating time entries made by employees is to be run every day, whereas a mass data run object schedule for a mass data run object for performing a financial business process for closing a fiscal quarter for a business is to be run on a quarterly basis on the day after a quarter ends.

In the example of system 100, the computer application was developed by a commercial software developer for use by many business enterprises and is configured for use by a particular business enterprise. The configuration may be a part of an implementation or deployment process that installs the computer application on a computer system (or systems) and/or prepares the computer application for use by a particular business enterprise. The configuration of the computer application may include setting values for configuration parameters that are used to control the business processes performed by the computer application. Setting values for configuration parameters may involve selecting from a set of multiple choices, directly entering, or otherwise identifying parameters. Some or all of the configuration parameters may have default values. Configuration of the computer application may occur as part of an implementation or deployment process that prepares the computer application for use by a particular business enterprise and occurs prior to processing business transaction data or otherwise executing a business process performed or supported by the computer application with "real" or "live" data. Additionally or alternatively, configuration of the computer application may occur after the computer application has been deployed and begun processing business transactions.

The application configuration component 115 is able, as part of a configuration process, to schedule for later execution computer operations by the computer application as part of a business transaction process. More particularly, the application configuration component 115 is able, as part of a configuration process, to schedule computer operations defined by the mass data run objects for later execution as part of a business transaction process. In the example of application computer 110, the computer operations for later execution are instructions (such as methods) to transform business transaction data without requiring further user input.

The application configuration component 115 includes an automatic scheduling process 130 that, when executed by a processor or processors as part of a configuration process, schedules mass data run objects for later execution. To do so, the automatic scheduling process 130 is started programmatically as part of a larger configuration process. For example, the automatic scheduling process 130 may be started in response to user input to initiate installation of a computer application (such as a human resource management application) or to install or otherwise enable a function (such as time management) for use within a computer application.

The automatic scheduling process 130 uses preconfigured mass data run object (MDRO) variants 132A-132D. A mass data run object variant is a representation of a mass data run object that has been preconfigured or has default selection parameters defined. The selection parameters in a mass data rim object variant are broad and designed to specify all of the business object instances on which a mass data run object is to perform a business process. For example, if a mass data run object is to aggregate employee time cards, the selection parameters in the MDRO variant for that mass data run object are designed to specify all employees that use the time management system to record time. Similarly, for a mass data run object used to create sales orders based on newly received purchase orders, the selection parameters in the MDRO variant for that mass data run object are designed to specify all newly received purchase orders.

The automatic scheduling process 130 uses the preconfigured MDRO variant to create a mass data run object instance that specifies the computer operations to be performed and having the selection parameters identified by the MDRO variant. The mass data run object instance is stored for use by the application runtime 120, as shown by arrow 172 indicating the mass data run object instance 126A. The automatic scheduling process 130 also schedules the created mass data run object instance 126A for later execution. In this example, the automatic scheduling process 130 creates a schedule 128A for executing the mass data run object, as shown by arrow 174 indicating mass data run object schedule 128A.

Later, based on the schedule 128A for a mass data run object, the application runtime 120 executes the mass data run object instance 126A as indicated by the mass data run object schedule 128A. The business process specified by the methods of the mass data object instance are performed on the business objects (such as business objects 124A-124C) selected based on the selection parameters in the mass data object instance being executed by the application runtime 120.

Notably, a business process is scheduled for later execution automatically by the computer application (here, as part of a configuration process) without requiring a user (such as a business analyst, a consult or IT professional, or an end-user) to schedule the business process. The automatic scheduling process schedules a mass data run object for later execution based on preconfigured MDRO variants in response to a computer application (or business function being selected) and does so without human intervention, such as receiving user input. Stated differently, the automatic scheduling process schedules a mass data run object for later execution in response to receiving an indication of a computer application (or business function) and without receiving addition user input or instruction. The automatic scheduling process may receive the indication of a computer application (or business function) as a result of an interactive user selection or based on programmatic input that is not based on direct user input through a user interface.

The ability of a computer application to schedule a business process automatically without human intervention or user input of selection parameters for mass data run objects during a configuration process may help to reduce the complexity, the time required, and the cost of deploying and implementing the computer application. This, in turn, may help to improve the quality of deployed computer application and also may help to reduce the total cost of ownership of the computer application.

The ability to automatically schedule a business process, without human intervention or user input of selection parameters for mass data run objects, may help a small or medium-sized business enterprise more easily and efficiently deploy a computer application by reducing the complexity or number of tasks to be performed to install and configure the computer application for use by the business enterprise. The ability to automatically schedule a business process may be particularly useful where a business enterprise can execute a computer operation of a mass data run object for all business transaction data transformed by the computer operation in a single run or in a continuous period of time. Stated differently, automatic scheduling of a mass data run object may be particularly helpful where the computer operation performed by the mass data run object can be performed on a single set of business transaction data that can be specified by a single set of broad selection parameters of the mass data run object.

The application configuration component 115 also may include a scheduling user interface 136 that enables a user to schedule computer operations of a computer application for later execution. The scheduling user interface 136 is not required for automatically scheduled mass data run objects, but the scheduling user interface 136 may be useful for scheduling computer operations that are not performed by an automatically scheduled mass data run object. In some implementations, the schedule for an automatically scheduled mass data run object may be modified or cancelled through the use of the scheduling user interface 136.

Figure 2:
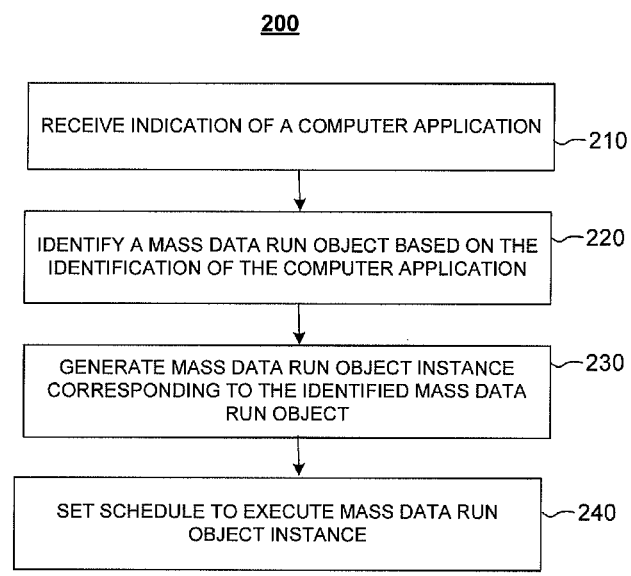
FIGS. 2 and 3 are flow charts of example processes for automated scheduling of a mass data run object for a business process to be performed by a computer for use by a particular business enterprise.

FIG. 2 depicts an example process 200 for automatically scheduling a business operation to be performed by a computer for use by a particular business enterprise. The process is performed by a processor or processors implementing an automatic scheduling process. In the example of FIG. 2, a processor receives an indication of a computer application (210). The indication of a computer application may be an indication of the computer application itself or may be an indication of a business function provided by the computer application. In one example, the automatic scheduling process may receive an indication that a computer application (such as a supply chain management application) is being (or is to be) configured. In another example, the automatic scheduling process may receive an indication of a business function performed by a computer application (such as a time management function provided by a human resource management application) is being installed (or is to be) configured. In some implementations, the automatic scheduling process 130 may receive an indication of a computer application based on the computer application being selected for installation from multiple selections of various applications to be installed and/or configured.

Based on the indicated computer application, the processor identifies a mass data run object (220). This may be accomplished, for example, by the processor looking up on a table or other collection of data the computer application to identify one or more mass data run objects that are to be scheduled (or are otherwise related to the computer application).

The processor also generates a mass data run object instance based on the identified mass data run object (230). This may be accomplished, for example, by the processor generating a mass data object instance that corresponds to the identified mass data run object, where selection parameters identify substantially all of the business transaction data to be transformed by a computer operation defined by the mass data run object instance.

The processor, based on the indicated computer application, further schedules for execution at a later time period the instructions identified by the mass data run object to perform the computer operation on business transaction data selected as defined by the selection parameters of the business object (240). This may be accomplished, for example, by generating a schedule record or object that initiates the mass data run object instance according to a schedule identified in the preconfigured variant.

Notably, the processor identifies the mass data run object, generates the mass data run object instance, and the schedules for execution at a later time period without human intervention in response to the received indication of the business function.

Figure 3:
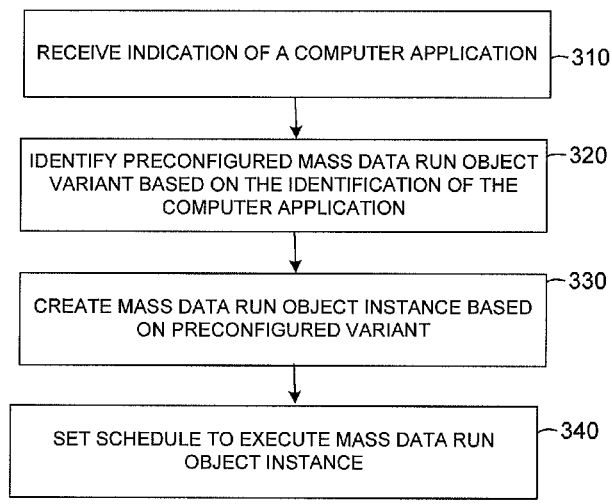

FIG. 3 depicts another example process for automatically scheduling a business operation to be performed by a computer for use by a particular business enterprise. The process may be performed by a processor or processors implementing an automatic scheduling process 130 described previously with respect to FIG. 1. In FIG. 3, like FIG. 2, the processor receives an indication of a computer application (310).

The processor identifies a preconfigured mass data run object variant based on the computer application identification (320). For example, the processor may use a look-up table or otherwise search for a mass data run object variant using the identity of the computer application or function to perform the search.

The processor creates a mass data run object instance based on the preconfigured variant of the mass data run object (330). This may be accomplished, for example, by instantiating a mass data run object instance for the corresponding mass data run object class. As part of the instantiation process, the instance is created having the methods of the class, which include a method or methods corresponding to the computer operation to be performed by the mass data run object. The processor also sets the selection parameters to the default selection parameters in the preconfigured mass data run object variant.

The process also sets a schedule to execute the mass data run object instance at a later time period (340). This may be accomplished, for example, by generating a schedule record or object that initiates the mass data run object instance according to a schedule identified in the preconfigured variant.

Figure 4:
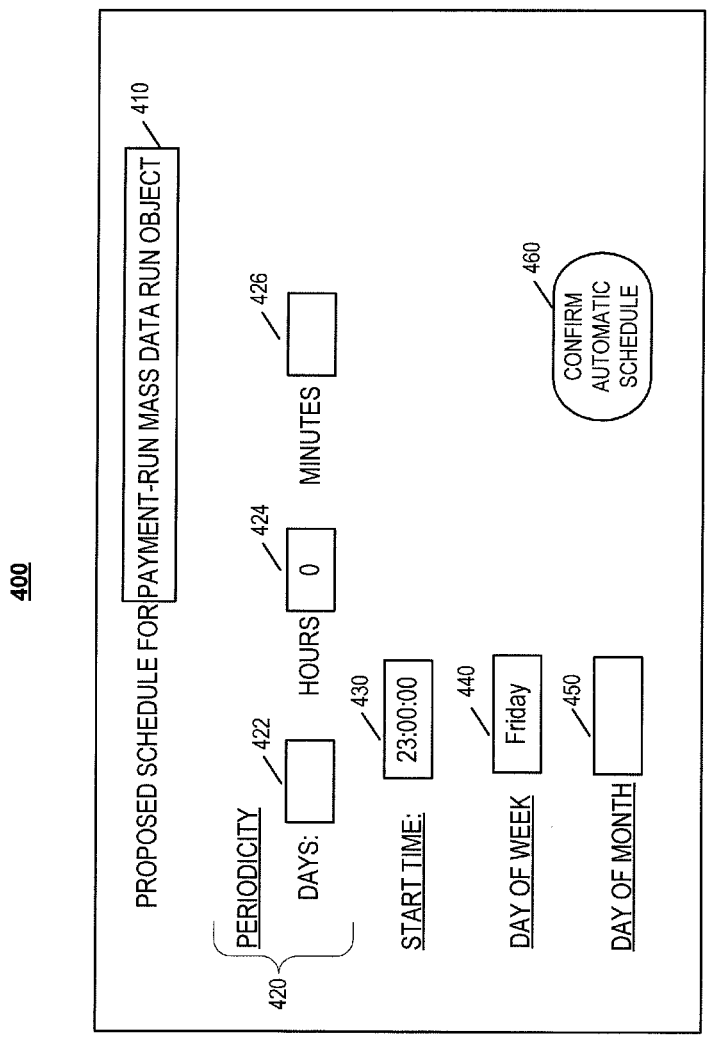
FIG. 4 depicts an example user interface that may be displayed on a display device of a computer and used to modify a schedule an automatically scheduled mass data run object.

FIG. 4 depicts an example user interface 400 that may be displayed on a display device of a computer and used to confirm a schedule an automatically scheduled mass data run object. As described previously with respect to FIG. 1, some implementations may enable a user to modify or cancel a schedule for an automatically scheduled mass data run object through the use of the scheduling user interface. Additionally or alternatively, some implementations may present to a user a proposed schedule that can be confirmed or modified by the user.

The user interface 400 depicts a proposed schedule for a mass data run object instance (here, a "payment-run mass data run object") automatically generated as part of a configuration process for a computer application to which the payment-run mass data run object applies. The user interface 400 identifies the mass data run object 410 for which the proposed schedule has been automatically generated. The mass data run object identified may have been, for example, generated by executing process 200 or process 300 described previously with respect to FIGS. 2 and 3, respectively.

The user interface 400 also includes examples of various ways to indicate a schedule for the mass data run object. As illustrated, the user interface 400 includes a periodicity for initiating the mass data run object. In this example, the periodicity is indicated by identifying the interval between executions of the mass data run object. The periodicity is indicated by identifying the interval in terms of the days 422, hours 424 and minutes 426 between runs of the mass data run object. The user interface 400 also includes a start time 430, day of week 420, and day of month 450 which may be used to indicate a repeating occurrence at which the mass data run object is executed.

The user interface 400 displays the schedule when the mass data run object is to be executed for review and confirmation by a user. Here, the payment-run mass data run object has been automatically scheduled to be executed at 11:00 p.m. (represented by start time 430 of 2300 hours) every Friday, as indicated by start-time field 430 and day-of-week field 440 on the user interface 400.

The user interface 400 also includes a control 460 for confirming the automatic schedule displayed as the proposed schedule. A user also may modify the schedule using fields 422, 424, 426, 430, 440 and 450 before activating control 460 to confirm the schedule indicated by the user interface 400.

Figure 5:
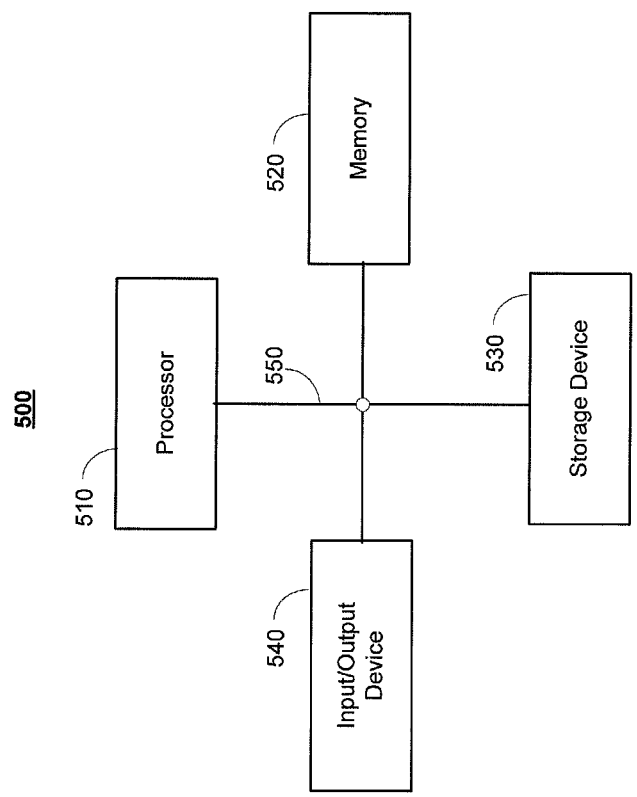
FIG. 5 is a block diagram of an example computer system configured to automatically schedule a mass data run object.

FIG. 5 is a block diagram of a computer system 500 that can be used in the operations described above, according to one implementation. The system 500 includes a processor 510, a memory 520, a storage device 530 and an input/output device 540. Each of the components 510, 520, 530 and 540 are interconnected using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In another implementation, the memory 520 is a volatile memory unit. In still another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

For example, the application computer 110 discussed previously with respect to FIG. 1 may include the processor 510 executing computer instructions that are stored in one of memory 520 and storage device 530.

The input/output device 540 provides input/output operations for the system 500. In one implementation, the input/output device 540 includes a keyboard and/or pointing device. In another implementation, the input/output device 540 includes a display unit for displaying graphical user interface as discussed above.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device, in computer-readable storage medium, or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the invention by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

The techniques can be implemented in a distributed manner. For example, the functions of the input/output device 540 may be performed by one or more computing systems, and the functions of the processor 510 may be performed by one or more computing systems.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A non-transitory computer program product tangibly embodied in computer-readable medium, the computer program product including instructions that, when executed, cause one or more processors to perform operations comprising:

receiving an indication of a business function provided by a computer application to be configured for use in a particular business enterprise wherein the computer application includes instructions that, when executed, cause business transaction data to be processed in a manner that is applicable to many different business enterprises;

in response to receiving the indication of the business function, identifying a mass data run object that relates to the particular business enterprise, wherein:

the mass data run object defines a computer operation to be performed by the computer application to transform business transaction data as part of a business process, and the mass data run object identifies i) selection parameters to select business transaction data to be transformed by the computer operation defined by the mass data run object and ii) instructions, that when executed, perform the computer operation to transform the selected business transaction data;

in response to identifying the mass data run object, generating a mass data run object instance corresponding to the identified mass data run object, wherein selection parameters identified by the mass data run object identify the business transaction data to be transformed by a computer operation defined by the mass data run object instance; and in response to generating the mass data run object instance, scheduling for execution at a later time period the instructions identified by the mass data run object to perform the computer operation on business transaction data selected as defined by the selection parameters of the mass data run object instance, wherein the identifying the mass data run object, the generating the mass data run object instance, and the scheduling for execution at a later time period are performed without human intervention in response to the received indication of the computer application.

2. The computer program product of claim 1 wherein without human intervention comprises without receiving user input.

3. The computer program product of claim 1 wherein the mass data run object comprises a type of mass data run object.

4. The computer program product of claim 1 wherein the mass data run object instance comprises a first instance of a mass data run object, the mass data run object comprises a second instance of the mass data run object, and the first instance is different than the second instance of the mass data run object.

5. The computer program product of claim 1 wherein the business transaction data comprises the business transaction data to be transformed by the computer operation defined by the mass data run object instance in a single run of the computer operation by the mass data run object instance.

6. The computer program product of claim 1 wherein the identifying the mass data run object, the generating the mass data run object instance, and the scheduling for execution at a later time period are performed without human intervention in response to the received indication of the business function occur during deployment of the computer application before the computer application is used to process business transaction data at the particular business enterprise.

7. The computer program product of claim 1 wherein identifying a mass data run object comprises identifying a mass data run object type.

8. The computer program product of claim 1 wherein the computer application comprises one of a customer relationship management application, an enterprise resource planning application, a supply chain management application, a supplier relationship management application, and a human resource management application.

9. The computer program product of claim 1 wherein the scheduling for execution comprises scheduling for execution by creating an entry that identifies the mass data run object instance.

10. The computer program product of claim 1 wherein the selection parameters of the mass data run object instance identify the employees employed by the particular business enterprise.

11. The computer program product of claim 1 wherein the selection parameters of the mass data run object instance identify the organizational units of the particular business enterprise.

12. The computer program product of claim 1 wherein the selection parameters of the mass data run object instance identify the products offered for sale by the particular business enterprise.

13. A computer system having one or more processors and including instructions that, when executed, cause at least one of the one or more processors to perform operations comprising:

receiving an indication of a business function provided by a computer application to be configured for use in a particular business enterprise wherein the computer application includes instructions that, when executed, cause business transaction data to be processed in a manner that is applicable to many different business enterprises;

in response to receiving the indication of the business function, identifying a mass data run object that relates to the particular business enterprise, wherein:

the mass data run object defines a computer operation to be performed by the computer application to transform business transaction data as part of a business process, and the mass data run object identifies i) selection parameters to select business transaction data to be transformed by the computer operation defined by the mass data run object and ii) instructions, that when executed, perform the computer operation to transform the selected business transaction data;

in response to identifying the mass data run object, generating a mass data run object instance corresponding to the identified mass data run object, wherein selection parameters identified by the mass data run object identify the business transaction data to be transformed by a computer operation defined by the mass data run object instance; and in response to generating the mass data run object instance, scheduling for execution at a later time period the instructions identified by the mass data run object to perform the computer operation on business transaction data selected as defined by the selection parameters of the mass data run object instance, wherein the identifying the mass data run object, the generating the mass data run object instance, and the scheduling for execution at a later time period are performed without human intervention in response to the received indication of the computer application.

14. The computer system of claim 13 wherein without human intervention comprises without receiving user input.

15. The computer system of claim 13 wherein the mass data run object comprises a type of mass data run object.

16. The computer system of claim 13 wherein the mass data run object instance comprises a first instance of a mass data run object, the mass data run object comprises a second instance of the mass data run object, and the first instance is different than the second instance of the mass data run object.

17. The computer system of claim 13 wherein the business transaction data comprises the business transaction data to be transformed by the computer operation defined by the mass data run object instance in a single run of the computer operation by the mass data run object instance.

18. The computer system of claim 13 wherein the identifying the mass data run object, the generating the mass data run object instance, and the scheduling for execution at a later time period are performed without human intervention in response to the received indication of the business function occur during deployment of the computer application before the computer application is used to process business transaction data at the particular business enterprise.

* * * * *